(12) United States Patent
Zhang et al.

(10) Patent No.: US 8,835,796 B2
(45) Date of Patent: Sep. 16, 2014

(54) DIFFUSER SHAPE VENT SLOTS IN A HAND TORCH SHIELD CASTELLATION

(75) Inventors: Yu Zhang, West Lebanon, NH (US); Zheng Duan, Hanover, NH (US)

(73) Assignee: Hypertherm, Inc., Hanover, NH (US)

( * ) Notice: Subject to any disclaimer, the term of this patent is extended or adjusted under 35 U.S.C. 154(b) by 588 days.

(21) Appl. No.: 12/967,407

(22) Filed: Dec. 14, 2010

(65) Prior Publication Data

US 2012/0012565 A1     Jan. 19, 2012

Related U.S. Application Data

(60) Provisional application No. 61/365,247, filed on Jul. 16, 2010.

(51) Int. Cl.
*B23K 10/00* (2006.01)
*H05H 1/34* (2006.01)
*B23K 10/02* (2006.01)
*B23K 9/013* (2006.01)

(52) U.S. Cl.
CPC .................. *B23K 10/02* (2013.01); *H05H 1/34* (2013.01); *B23K 10/00* (2013.01); *H05H 2001/3457* (2013.01); *B23K 9/013* (2013.01)
USPC ................................... 219/121.48; 219/121.5

(58) Field of Classification Search
USPC ......... 219/74, 121.39, 121.48, 121.5, 121.51, 219/121.52, 121.59
See application file for complete search history.

(56) References Cited

U.S. PATENT DOCUMENTS

| 4,861,962 | A | 8/1989 | Sanders et al. |
| 6,914,211 | B2 | 7/2005 | Brasseur et al. |
| 2004/0169018 | A1* | 9/2004 | Brasseur et al. ........... 219/121.5 |
| 2007/0210035 | A1 | 9/2007 | Twarog et al. |

* cited by examiner

*Primary Examiner* — Brian Jennison
(74) *Attorney, Agent, or Firm* — Proskauer Rose LLP

(57) ABSTRACT

A torch tip for a plasma arc torch includes a body having a first end, configured to attach to the torch, and a second end, where an end wall is disposed. A plasma exit orifice is formed in the end wall. At least two castellations are formed in the end wall. At least one slot is disposed between two castellations. Each slot is defined by a first and second castellation wall, and a slot floor. The first castellation wall is opposite the second castellation wall. The torch tip has at least one of the following characteristics: a slope of the slot floor within the at least one slot tapers in an outward radial direction relative to the plasma exit orifice toward the first end of the body, or a distance between the first and second castellation walls along the slot floor increases with distance away from the exit orifice.

17 Claims, 9 Drawing Sheets

DIFFUSER SHAPE VENT SLOTS IN A HAND TORCH SHIELD CASTELLATION

RELATED APPLICATIONS

This application claims the benefit of and priority to U.S. Provisional Application No. 61/365,247, filed Jul. 16, 2010, the entirety of which is hereby incorporated herein by reference.

TECHNICAL FIELD

The present invention relates generally to plasma arc cutting torches, and more particularly, to diffuser shape vent slots in a hand torch shield consumable.

BACKGROUND

Welding and plasma arc torches are widely used in the welding, cutting, and marking of materials. A plasma torch generally includes an electrode and a nozzle having a central exit orifice mounted within a torch body, electrical connections, passages for cooling, passages for arc control fluids (e.g., plasma gas), and a power supply. Optionally, a swirl ring is employed to control fluid flow patterns in the plasma chamber formed between the electrode and nozzle. The torch produces a plasma arc, a constricted ionized jet of a gas with high temperature and high momentum. Gases used in the torch can be non-reactive (e.g., argon or nitrogen) or reactive (e.g., oxygen or air). In operation, a pilot arc is first generated between the electrode (cathode) and the nozzle (anode). Generation of the pilot arc can be by means of a high frequency, high voltage signal coupled to a DC power supply and the torch or by means of any of a variety of contact starting methods.

In some torches, a shield is used to prevent molten spatter from damaging the other components of the torch, for example, the electrode, nozzle, or swirl ring. Often, the molten spatter builds up on the shield causing double arcing or melting of the shield. The build-up typically increases as the cutting time increases.

To decrease the amount of molten spatter that builds up on the shield, prior torches have used shields with vent slots added to the end face of the shield. The vent slots act as channels for melted metal, for example, slag, to leave the end face of the shield. These shields employ four slots that are arranged in a symmetrical pattern about the end face surrounding a plasma exit orifice. The slots retain the same dimensions as a function of distance from the plasma exit orifice.

Prior art shields with vent slots do not adequately remove slag for certain applications. Instead, the slag builds up on the shield and within the vent slots. The slag can block all or a portion of the vent slots resulting in a double arc or melting of the shield. Cleaning slag build-up is difficult. Operators often replace the shield once build-up has occurred instead of performing the time-consuming task of cleaning the shield. The slag build-up can also lead to premature failure of the shield and, sometimes, the premature failure of other consumables. In addition, slag build-up can increase the down time of the torch because the operator is required to stop the system to either clean or replace the shield when too much build-up occurs. Increased down time and premature consumable failure result in increased operating costs.

SUMMARY OF THE INVENTION

What is needed is a shield that reduces the molten spatter buildup during operation of the torch. Several variables can be altered to address the problem, for example, shield slot size and shape and shield castellation mass and shape. Altering the shield slot size and shape affects the molten spatter buildup. For example, increasing the size of the shield slot increases the amount of molten spatter that can be removed from the shield. Altering the shield castellation mass and shape affects the heat transfer properties of the shield (e.g., how quickly the shield melts). For example, increasing the castellation mass increases the amount of heat the shield can absorb.

However, simply reducing the number and/or size of the shield slots to increase the number and/or size of the castellations or vice-versa is insufficient. First, altering the properties of the vent slots to maximize molten spatter removal adversely affects the castellation mass and heat transfer properties of the shield. Second, altering the properties of the castellation mass to increase the heat transfer properties of the shield adversely affects the vent slot openings and shape resulting in molten spatter buildup. Therefore, the number, size, and shape (or geometry) of both the shield slots and castellations should be balanced or optimized to avoid slag build-up and premature melting, respectively. The appropriate balance of these factors can increase the performance and life of the shield.

In one aspect, the invention features a torch tip for a plasma arc torch for reducing molten spatter buildup during operation of the plasma arc torch. The torch tip includes a body having a first end and a second end. The first end of the body is configured to attach to the plasma arc torch. The torch tip also includes an end wall disposed at the second end of the body. A plasma exit orifice is formed in the end wall at the second end of the body. At least two castellations are formed in the end wall. At least one slot is disposed between two castellations. The at least one slot is defined by a first castellation wall, a second castellation wall, and a slot floor. The first castellation wall is opposite the second castellation wall. The torch tip having at least one of the following characteristics: (a) a slope of the slot floor within the at least one slot tapers in an outward radial direction relative to the plasma exit orifice toward the first end of the body, or (b) a distance between the first and second castellation walls along the slot floor increases with distance away from the plasma exit orifice.

In another aspect, the invention features a shield for a plasma arc torch. The shield includes a body having a first end and a second end. The first end of the body is configured to attach to the plasma arc torch. The shield also includes an end wall disposed at the second end of the body. A plasma exit orifice is formed in the end wall at the second end of the body. The shield also includes no more than three slots disposed between the at least two castellations. Each slot has a generally semi-frustoconical geometry. Each slot is defined by a first castellation wall, a second castellation wall, and a slot floor. The first castellation wall is opposite the second castellation wall.

In yet another aspect, the invention features a torch tip for a plasma arc torch for reducing molten spatter buildup during operation of the plasma arc torch. The torch tip includes a body having a first end and a second end. The first end of the body configured to attach to the plasma arc torch. An end wall is disposed at the second end of the body. A plasma exit orifice is formed in the end wall at the second end of the body. Three castellations are formed in the end wall. The torch tip includes three slots disposed between the castellations. Each slot is defined by a first castellation wall, a second castellation wall, and a slot floor. The first castellation wall is opposite the second castellation wall.

In another aspect the invention features a plasma arc torch system. The system includes a torch body defining a plasma gas flow path for directing a plasma gas to a plasma chamber in which a plasma arc is formed. The system also includes an electrode disposed within the torch body. The system further includes a nozzle disposed relative to the electrode at a distal end of the torch body to define the plasma chamber. A shield is disposed relative to an exterior surface of the nozzle at the distal end of the torch body. The shield includes a shield body having a first end configured to attach to the torch body and a second end. An end wall is disposed at the second end of the body. The shield also includes a plasma exit orifice formed in the end wall at the second end of the shield body. At least two castellations are formed in the end wall. The shield also includes at least one slot disposed between two castellations. The at least one slot is defined by a first castellation wall, a second castellation wall, and a slot floor. The first castellation wall is opposite the second castellation wall. The shield has at least one of the following characteristics: (a) a slope of the slot floor within the at least one slot tapers in an outward radial direction relative to the plasma exit orifice toward the first end of the body, or (b) a distance between the first and second castellation walls along the slot floor increases with distance away from the plasma exit orifice.

In some embodiments, the torch tip or shield includes three slots. The torch tip or shield can include three slots and three castellations separating each of the slots. In some embodiments, each castellation has a substantially planar top surface.

The at least one slot can have a rounded, generally semi-cylindrical, or generally semi-frustoconical geometry.

The torch tip can be a shield. In some embodiments, the torch tip or shield is made from a material having a high thermal conductivity. The torch tip or shield can be formed of copper.

In some embodiments, the first castellation wall and the second castellation wall are angled from about 45 arc degrees to about 75 arc degrees about the end wall.

In some embodiments, the height of the first and second castellation walls increases with distance from the exit orifice.

The torch tip or shield can have at least one of the following characteristics: (a) a slope of the slot floor within the at least one slot tapers in an outward radial direction relative to the plasma exit orifice toward the first end of the body, or (b) a distance between the first and second castellation walls along the slot floor increases with distance away from the plasma exit orifice. In some embodiments, the slots can extend radially from the plasma exit orifice.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

DETAILED DESCRIPTION

Figure 1:
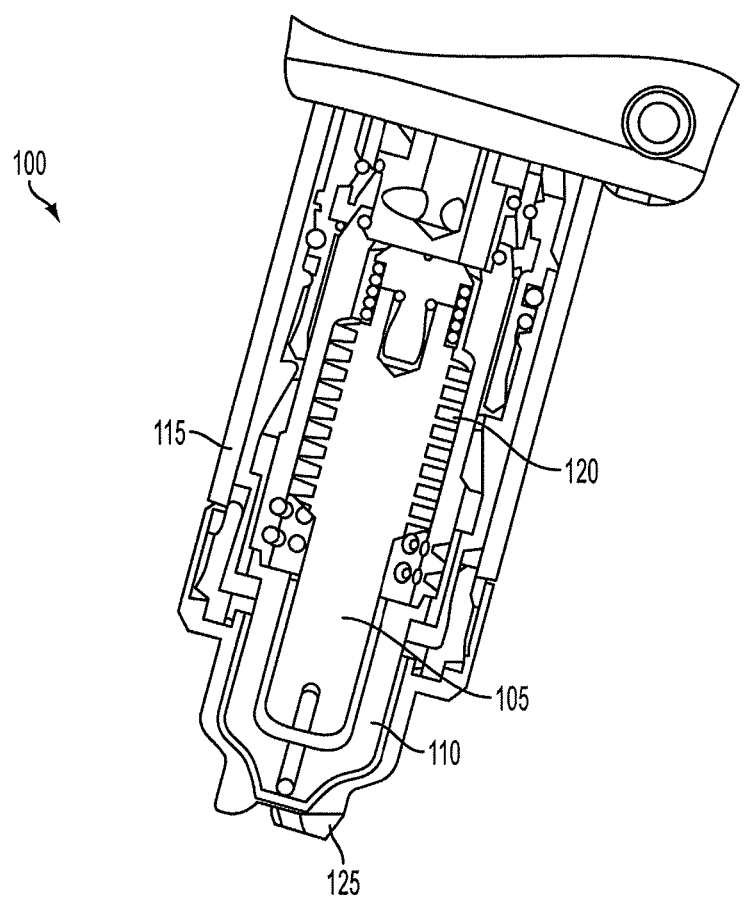
FIG. 1 is a cross-sectional view of a plasma arc torch tip.

FIG. 1 shows a cross-sectional view of a plasma arc torch 100. A plasma torch tip is comprised of a variety of different consumables, for example, an electrode 105, a nozzle 110, a retaining cap 115, a swirl ring 120, or a shield 125. The nozzle 110 has a central exit orifice mounted within a torch body. The torch and torch tip can include electrical connections, passages for cooling, and passages for arc control fluids (e.g., plasma gas). The shield 125 is used to prevent molten spatter from damaging the other components of the torch, for example, the electrode 105, nozzle 110, retaining cap 115, or swirl ring 120. Often, the molten spatter builds up on the shield 125 causing double arcing or melting of the shield 125. The build-up typically increases as the cutting time increases.

Figure 2:
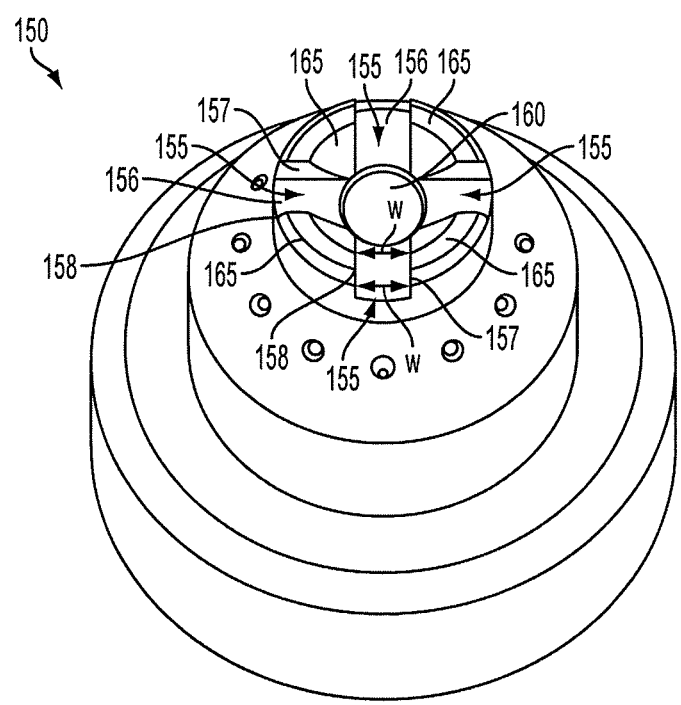
FIG. 2 is a perspective view of a torch tip having four parallel slots.

To decrease the amount of molten spatter buildup on the shield, slots can be added to the shield to create a channel for the molten spatter to exit the shield. FIG. 2 shows a prior art torch tip 150 having four symmetrical vent slots 155. The vent slots 155 are arranged in a symmetrical pattern around the plasma exit orifice 160. The vent slots 155 retain the same profile dimensions as a function of distance from the plasma exit orifice 160. For example, the width w of the slot floor 156 at the plasma exit orifice 160 is the same as the width w of the slot floor 156 at a distance away from the plasma exit orifice 160. In addition, the width of the slots 155 is the same at the plasma exit orifice 160 as the width of the slots 155 at a distance from the plasma exit orifice 160. In other words, the slot walls 157, 158 do not taper and are parallel to each other. These vent slots 155 create a channel that allows the molten spatter to exit the shield. However, these prior art torch tips or shields are inadequate for certain applications and often have substantial molten spatter buildup, which can occupy some or all of the regions of the slots, effectively blocking the channels.

The torch tip 150 also has four castellations 165 that separate each of the slots 155. The castellations 165 absorb the heat generated by the plasma arc torch. Another heat source of the shield is located at the vent surface, where heat can be transferred from the molten spatter to the shield. The more solid mass that is distributed in the castellations the more heat the shield can absorb from the surrounding environment. In addition, the heat capacitance of the material used to make the shield is related to how much heat the shield can absorb from the surrounding environment. A higher heat capacitance can result in better shield performance, because the shield can absorb more heat while remaining at a lower temperature than a shield with a lower heat capacitance. A shield that has a low castellation mass and/or a low heat capacitance can melt prematurely.

To reduce the amount of molten spatter buildup and prevent the torch tip or shield from melting prematurely, a shield can be designed that balances the need to reduce the amount of molten spatter buildup with the mass of the shield castellations to prevent premature melting of the consumable.

Figure 3:
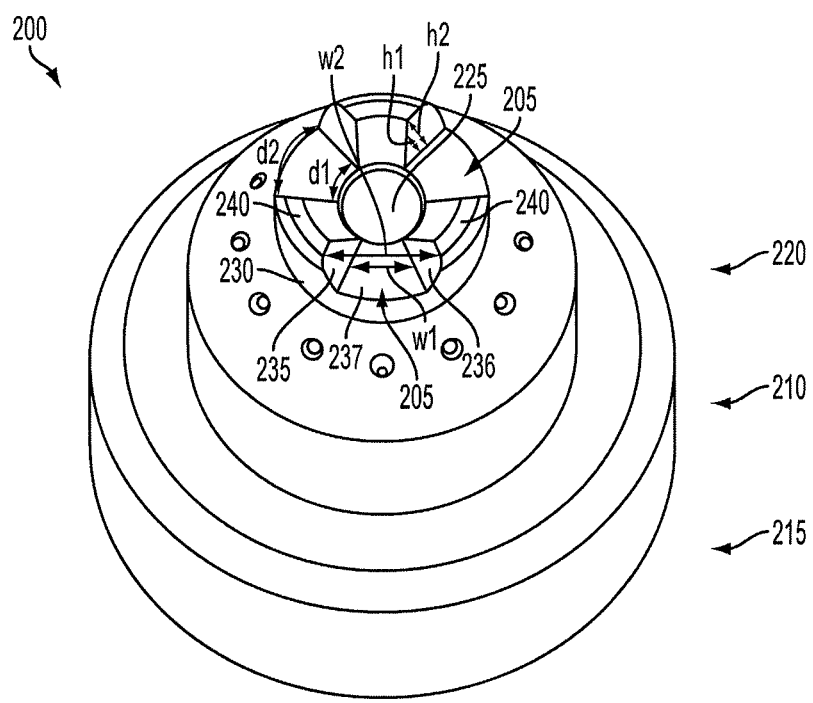
FIG. 3 is a perspective view of a torch tip having three slots, according to an illustrative embodiment of the invention.
Figure 4A:
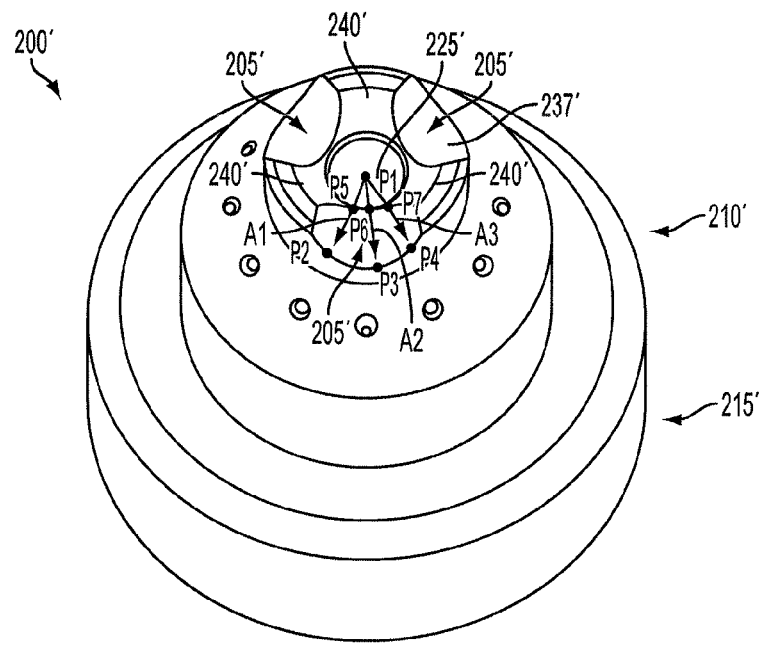
FIG. 4A is a perspective view of a torch tip having three slots with a generally semi-frustoconical geometry, according to an illustrative embodiment of the invention.
Figure 4B:
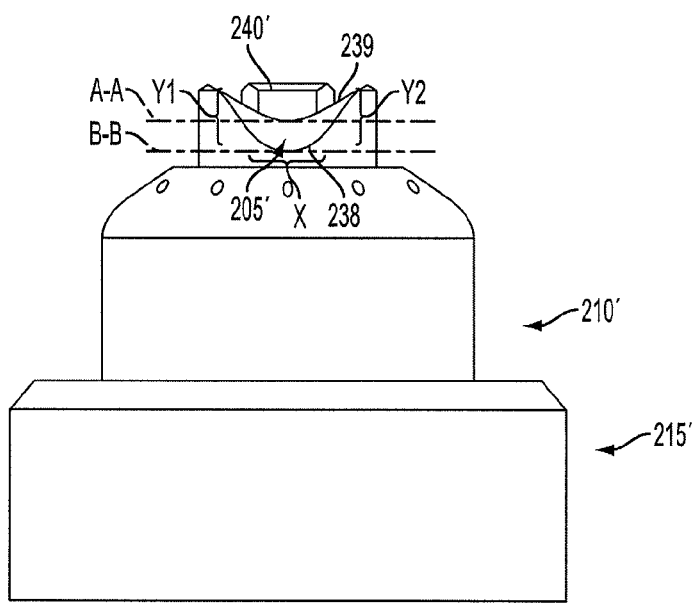
FIG. 4B is a side view of the torch tip shown in FIG. 4A, e.g., a torch tip having three slots with a generally semi-frustoconical geometry, according to an illustrative embodiment of the invention.

FIG. 3 shows a perspective view of a torch tip 200 having three slots 205, according to an illustrative embodiment of the invention. FIG. 4A shows a perspective view of a torch tip 200' having three slots 205' with a generally semi-frustoconical geometry, according to an illustrative embodiment of the invention. FIG. 4B shows a side view of the torch tip 200' shown in FIG. 4A, e.g., a torch tip having three slots 205' with a generally semi-frustoconical geometry, according to an illustrative embodiment of the invention. Referring to FIG. 3, the torch tip 200 includes a body 210, having a first end 215 and a second end 220. The torch tip also includes an end wall 230 disposed at the second end 220 of the body 210. A plasma exit orifice 225 is formed in the end wall 230 at the second end 220 of the body 210. The first end 215 of the body 210 is configured to attach to a plasma arc torch (such as the torch shown in FIG. 1). The torch tip 200 can attach to a plasma arc torch using any fastening mechanism, for example, threads, friction fit, press fit, etc.

The torch tip 200 also includes at least two castellations 240 formed in the end wall 230. The castellations can be generally rectangular in nature or the castellations can be curved, e.g., crenulations. In some embodiments, the castellations can be crenulations or a standoff. At least one slot 205 is disposed between two castellations 240. Each slot is defined by three sides, a first castellation wall 235, a second castellation wall 236 and a slot floor 237. The first castellation wall 235 and the second castellation wall 236 are opposite each other. Referring to FIG. 4B, when the slot 205' has a curved, rounded, generally semi-cylindrical, or generally semi-frustoconical geometry, the slot floor can be located in the lower portion of the slot, for example, in region X, and the first and second castellation walls can be located in the upper regions of the slot, for example, in regions Y1 and Y2.

The torch tip 200, and more particularly the slots 205, can have at least one of two characteristics. The first characteristic is that a slope of the slot floor 237 within the at least one slot 205 tapers in an outward radial direction relative to the plasma exit orifice 225 toward the first end 215 of the body 210. For example, the slot floor 237 tapers toward the first end 215 of the body 210 as a function of distance away from the plasma exit orifice 225 such that a first location on an outer edge of the slot floor 237 (e.g., the edge of the slot floor 237 that is farthest away from the plasma exit orifice 225) is closer to the first end 215 of the torch tip 200 than a second location on an inner edge of the slot floor 237 (e.g., the edge of the slot floor that is closest to the plasma exit orifice 225). Referring to FIG. 4A, a first location P2, P3, P4 on an outer edge of the slot floor 237' is closer to the first end 215' of the torch tip 200' than a second location P5, P6, P7 on an inner edge of the slot floor 237'. The first P2, P3, P4 and second P5, P6, P7 locations can be axially aligned relative to an axis A1, A2, A3 extending from a center P1 of the plasma exit orifice 225'. For example, axis A1 contains first location P2 on the outer edge of the slot floor 237', second location P5 on the inner edge of the slot floor 237', and a center P1 of the plasma exit orifice 225'. Axis A2 contains first location P3 on the outer edge of the slot floor 237', second location P6 on the inner edge of the slot floor 237', and a center P1 of the plasma exit orifice 225'. Axis A3 contains first location P4 on the outer edge of the slot floor 237', second location P7 on the inner edge of the slot floor 237', and a center P1 of the plasma exit orifice 225'. In other words, referring to FIG. 4B, the slot floor tapers in a downward direction toward the first end 215' of the body 210', tapering away from the plane A-A (e.g., the plane A-A is perpendicular to the sheet of paper) that contains the inner edge 239 of the slot floor. The outer edge 238 of the slot floor is in a different plane B-B (e.g., the plane B-B is perpendicular to the sheet of paper) than the plane A-A that contains the inner edge 239 of the slot floor. For example, referring to FIG. 3, the slot floor 237 located in the end wall 230 can be shaped like a bowl or a turtle shell, with its highest point in the region of the plasma exit orifice 225.

Still referring to FIG. 3, the second characteristic is that a distance between the first castellation wall 235 and the second castellation wall 236 along the slot floor 237 increases with distance away from the plasma exit orifice 225. For example, distance d1 (e.g., the distance between the first castellation wall 235 and the second castellation wall 236 as measured at the slot floor 237 near the plasma exit orifice 225) is less than distance d2 (e.g., the distance between the first castellation wall 235 and the second castellation wall 236 as measured at the slot floor 237 farthest away from the plasma exit orifice 225).

In one embodiment, the torch tip 200 can have the first characteristic. In another embodiment, the torch can have the second characteristic. In another embodiment, the torch tip 200 can have both the first characteristic and the second characteristic.

In yet another embodiment, the torch tip 200 can have a third characteristic. The distance between the first castellation wall 235 and the second castellation wall 236 can increase with distance away from the slot floor 237. For example, the first castellation wall 235 and the second castellation wall 236 can taper such that the distance w1 between the first castellation wall 235 and the second castellation wall 236 at the slot floor 237 is less than the distance w2 between the first castellation wall 235 and the second castellation wall 236 at a location away from the slot floor 237.

In some embodiments, the torch tip 200 can include all three characteristics or any combination thereof. For example, the torch tip can have the first and third characteristic or the second and third characteristic.

In some embodiments, the height of the first and second castellation walls 235, 236 increases with distance from the exit orifice. For example, the height h1 of the first castellation wall 235 and the second castellation wall 236 at a location close to the plasma exit orifice 225 is shorter than the height h2 of the first castellation wall 235 and the second castellation wall 236 at a location farther away from the plasma exit orifice 225.

In some embodiments, the torch tip 200, 200' is a shield. The torch tip 200, 200' or shield can be made from a material having a high thermal conductivity, for example, copper.

As shown in FIGS. 3 and 4A, the torch tip 200, 200' can have three slots, 205, 205', respectively. In this embodiment, the torch tip 200, 200' has three slots 205, 205' and three castellations 240, 240', respectively. Each castellation 240, 240' can separate two of the three slots 205, 205'. In some embodiments, each castellation 240, 240' has a substantially planar top surface. The slots 205, 205' and castellations 240, 240' can be arranged in a symmetrical pattern around the plasma exit orifice 225, 225', respectively.

The slots 205, 205' can have a rounded, generally semi-cylindrical, or generally semi-frustoconical geometry. For example, the slots 205' have a generally semi-frustoconical geometry as shown in FIGS. 4A and 4B. In general, the slots 205, 205' can have any other type of geometry that is conducive to reducing the amount of molten spatter buildup during operation of a plasma arc torch.

In some embodiments, the shield has no more than three slots each having a generally semi-frustoconical geometry. In some embodiments, the torch tip or shield has exactly three slots and three castellations. In some embodiments, the slots 205, 205' extend radially from the plasma exit orifice 225, 225', respectively.

Figure 5A:
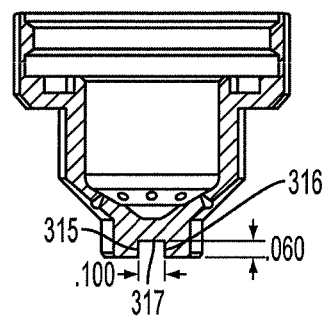
FIG. 5A is a cross-sectional view of the torch tip of FIG. 2.
Figure 5B:
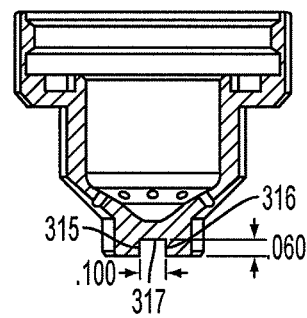
FIG. 5B is a cross-sectional view of the torch tip of FIG. 2.
Figure 5C:
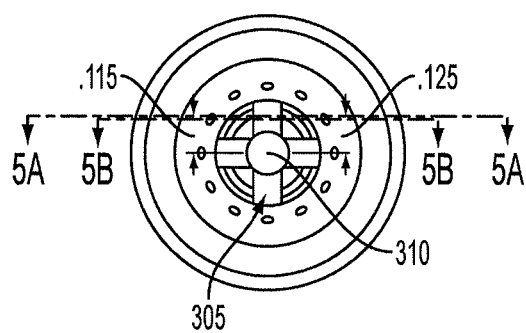
FIG. 5C is a top view of the torch tip of FIG. 2.
Figure 6A:
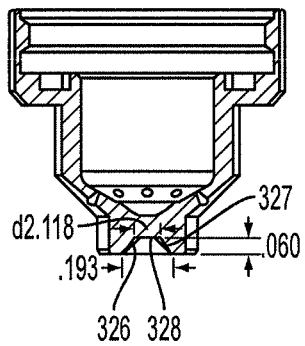
FIG. 6A is a cross-sectional view of the torch tip of FIG. 3, according to an illustrative embodiment of the invention.
Figure 6B:
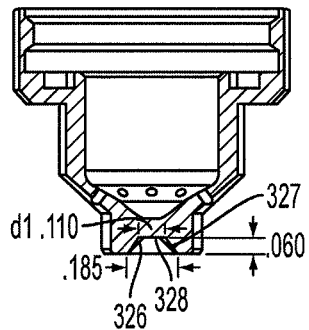
FIG. 6B is a cross-sectional view of the torch tip of FIG. 3, according to an illustrative embodiment of the invention.
Figure 6C:
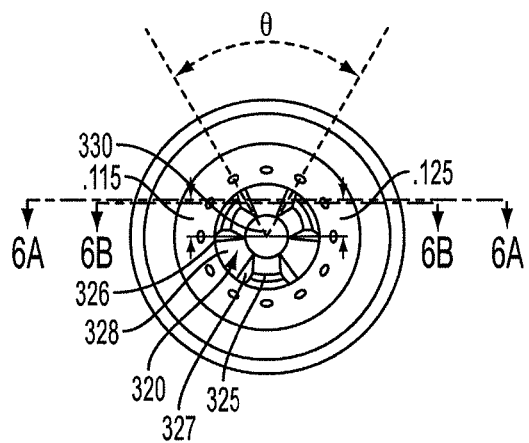
FIG. 6C is a top view of the torch tip of FIG. 3, according to an illustrative embodiment of the invention.
Figure 7A:
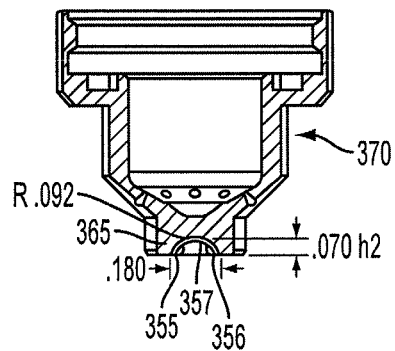
FIG. 7A is a cross-sectional view of the torch tip of FIG. 4A, according to an illustrative embodiment of the invention.
Figure 7B:
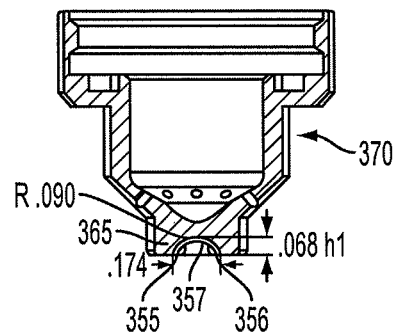
FIG. 7B is a cross-sectional view of the torch tip of FIG. 4A, according to an illustrative embodiment of the invention.
Figure 7C:
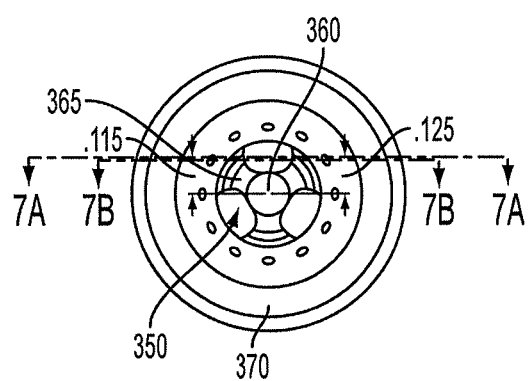
FIG. 7C is a top view of the torch tip of FIG. 4A, according to an illustrative embodiment of the invention.

FIGS. 5A-5C are schematic illustrations, including side views and a top view, of the torch tip of FIG. 2. FIGS. 6A-6C are a schematic illustrations, including side views and a top view, of the torch tip of FIG. 3, according to an illustrative embodiment of the invention. FIG. 7A-7C are schematic illustrations, including side views and a top view, of torch tip of FIG. 4, according to an illustrative embodiment of the invention.

FIGS. 5A-5C, 6A-6C, and 7A-7C provide additional details about the shields in FIGS. 2, 3, and 4, respectively. As shown in FIGS. 5A-5C, the prior art shield has four slots 305 that are arranged symmetrically around the plasma exit orifice 310. The slots 305 are not curved or tapered. The slots 305 are instead generally semi-rectangular and the castellation walls 315, 316 form right angles with the slot floor 317. The slot floor 317 of the shield is generally flat. This slot geometry is not optimal because molten spatter can easily build up in the slot, particularly, the molten spatter can build up where the castellation walls 315, 316 meet the slot floor 317.

Still referring to FIGS. 5A-5C, the slot geometry does not change based on the distance from the plasma exit orifice 310. FIG. 5A represents the cross-section of the torch tip labeled 5A in FIG. 5C and FIG. 5B represents the cross-section of the torch tip labeled 5B in FIG. 5C. Section 5B is slightly closer to the central exit orifice 310 than section 5A. Comparing section 5B to section 5A, the geometry does not change. For example, the depth of the slot is 0.060 in both sections 5A and 5B. In addition, the distance between the first and second castellation walls 315, 316 is 0.100 inches in both sections 5A and 5B.

As shown in FIGS. 6A-6C and 7A-7C, the number of slots and the slot geometry has been modified to optimize the performance and life of the shield. As shown, the shields have three slots 320 and three castellations 325. Comparing FIGS. 6A-6C with FIG. 5A-5C, the castellation walls 326, 327 of the shield of FIGS. 6A-6C are tapered such that a distance between the first and second castellation walls 326, 327 along the slot floor 328 increases with distance away from the plasma exit orifice 330 (e.g., the distance d1 is less than the distance d2). The castellation walls 326, 327 are also tapered such that the distance between the castellation walls 326, 327 increases with distance away from the slot floor 328 (e.g., the width w1 is less than the width w2).

Referring to FIGS. 6A-6C, the first and second castellation walls 236, 327 and the slot floor 328 have an angle θ from about 45 arc degrees to about 75 arc degrees about the end wall. In some embodiments, the first and second castellation walls 236, 327 and the slot floor 328 have an angle θ of about 60 arc degrees about the end wall.

As shown in FIGS. 6A-6C, the slot geometry changes based on the distance from the plasma exit orifice 330. FIG. 6A represents the cross-section of the torch tip labeled 6A in FIG. 6C and FIG. 6B represents the cross-section of the torch tip labeled 6B in FIG. 6C. Section 6B is slightly closer to the plasma exit orifice 330 than Section 6A. The distance between the castellation walls 326, 327 increases with distance from the plasma exit orifice 330. The distance between the castellation walls 326, 327 at the slot floor 328 in section 6B is 0.110 and that distance increases to 0.118 in section 6A. In addition, the distance between the castellation walls 326, 327 at a distance away from the slot floor 328 also increases with distance from the plasma exit orifice 330, for example, the distance increases from 0.185 in section 6B to 0.193 in section 6A. The depth of the slot remains constant in this embodiment, at 0.060 inches in both sections 6A and 6B.

FIGS. 7A-7C shows another embodiment of the invention. The slot 350 is generally semi-frustoconical in geometry. Similar to FIGS. 6A-6C, the distance between the castellation walls 355, 356 increases at both the slot floor 357 and at a distance away from the slot floor 357 with distance away from the plasma exit orifice 360. FIG. 7A represents the cross-section of the torch tip labeled 7A in FIG. 7C and FIG. 7B represents the cross-section of the torch tip labeled 7B in FIG. 7C. For example, section 7B is slightly closer to the plasma exit orifice 360 than section 7A. The radius of the generally semi-frustoconsical slot increases with distance from the plasma exit orifice, for example, the radius is 0.090 in section 7B and the radius increases to 0.092 in section 7A. In addition, the distance between the castellation walls 355, 356 at a distance away from the slot floor 357 also increases with distance from the plasma exit orifice 360, for example, the distance increases from 0.174 in section 7B to 0.180 in section 7A. In addition, the height of the slot 350 also increases with distance from the plasma exit orifice 360 (e.g., the height h1 is less than the height h2). For example, in section 7B, the distance from the slot floor 357 to the top of the castellation 365 is about 0.068. In section 7A, this distance increases to 0.070. This indicates that the slot floor is tapered toward the shield body 370 with distance away from the plasma exit orifice 360. Another indication that the slot floor tapers with distance away from the plasma exit orifice is shown in 4B. The slot floor tapers in an outward radial direction relative to the plasma exit orifice toward the first end 215' of the body 210'. Thus, the slot floor tapers away from the plane A-A that contains the inner edge 239 of the slot floor. The outer edge 238 of the slot floor is in a different plane B-B than the plane A-A that contains the inner edge 239 of the slot floor.

Figure 8:
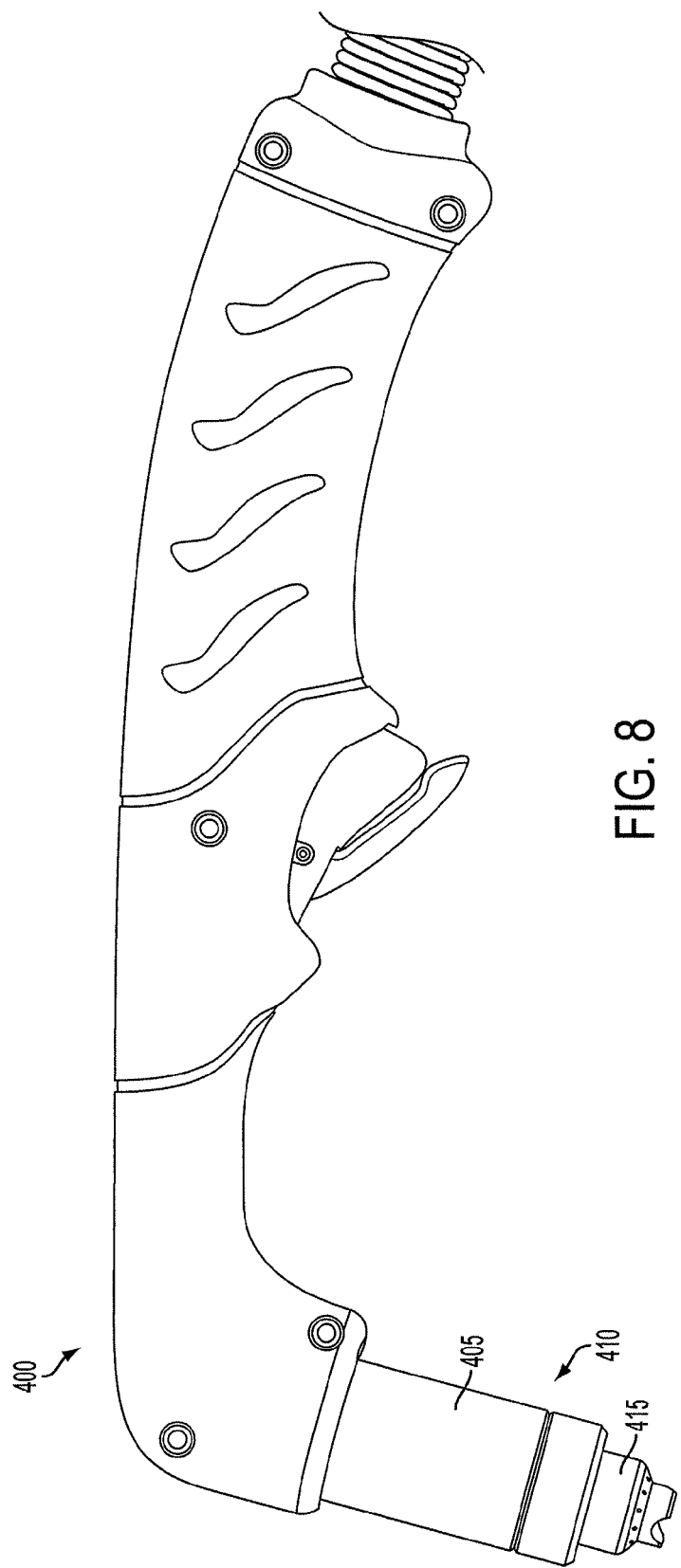
FIG. 8 is a schematic illustration of a plasma arc torch system, according to an illustrative embodiment of the invention.

The invention in another aspect features a plasma arc torch system. FIG. 8 is a schematic illustration of a plasma arc torch system 400, according to an illustrative embodiment of the invention. The torch system includes a torch body 405 that defines a plasma gas flow path for directing a plasma gas to a plasma chamber in which a plasma arc is formed. An electrode (not shown) is disposed within the torch body 405. The electrode can be, for example, the electrode 105 of FIG. 1. A nozzle (not shown) is disposed relative to the electrode at a distal end 410 of the torch body 405. The nozzle can be, for example, nozzle 110 of FIG. 1. The torch system 400 also includes a shield 415 disposed relative to an exterior surface of the nozzle at the distal end 410 of the torch body 405. The shield can be, for example, any of the embodiments of the shield or torch tip described above with reference to FIG. 3, 4A, 4B, 6A-6C, or 7A-7C.

A torch tip or shield as described with reference to FIG. 3, 4A, 4B, 6A-6C, or 7A-7C reduces molten spatter buildup during operation of the plasma arc torch. In addition, the torch tip or shield is easier to clean than the torch tip or shield described with reference to FIG. 2 or 5A-5C. Furthermore, the torch tip or shield as described with reference to FIG. 3, 4A, 4B, 6A-6C, or 7A-7C does not melt as easily or quickly as the torch tip or shield described with reference to FIG. 2 or 5A-5C. These benefits can be achieved by the balance between the number of the slots, the slot shape and geometry and the number of castellations and the mass of the castellations.

Improved performance of the shields illustrated in FIGS. 3, 4A and 4B over the shield illustrated in FIG. 2 can be shown by comparing the amount of molten spatter each shield accumulates under set conditions. For example, the shields illustrated in FIGS. 2, 3, and 4A and B were tested using a robot to pierce perpendicular to the work piece while directly contacting the material during cutting (e.g., 0" standoff), with each shield repeated 30 times. After each pierce cut, the shields were weighed to monitor the weight gain of the present slag.

Figure 9:
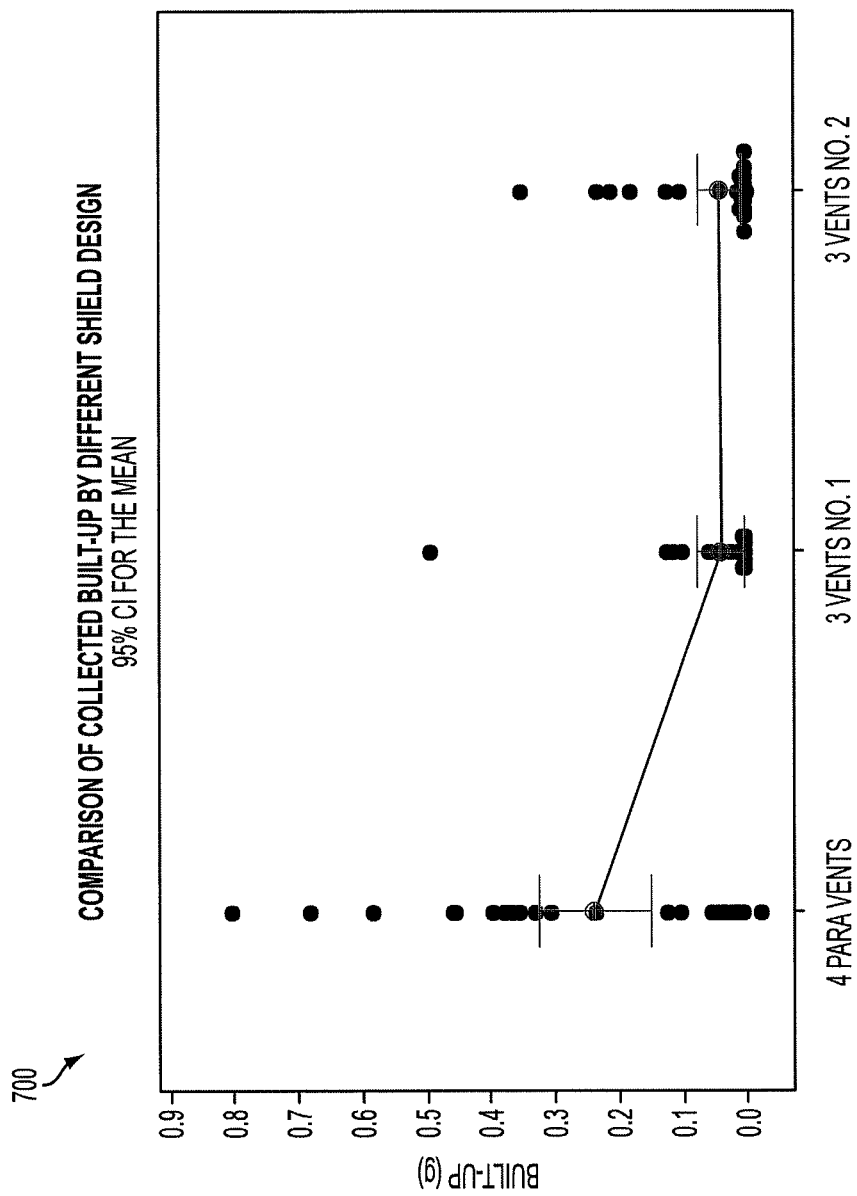
FIG. 9 is a graph of molten spatter buildup on each of the three torch tips shown in FIGS. 2, 3, and 4A.

FIG. 9 is a graph 700 of molten spatter buildup on each of the three torch tips shown in FIGS. 2, 3, and 4A and B, showing the results of the example described above. The shield illustrated in FIG. 2, labeled "4 Para Vents" on FIG. 9, with four vent slots, showed the most slag buildup. The average slag buildup for the shield illustrated in FIG. 2 was about 0.25 grams. In contrast, the average slag buildup for the shields illustrated in FIG. 3, labeled "3 Vents No. 1", and the shield illustrated in FIGS. 4A and B, labeled "3 Vents No. 2", was about 0.05 grams. The shields of FIGS. 3, 4A and 4B reduced about 80% of the slag buildup of the shield of FIG. 2.

Although various aspects of the disclosed method have been shown and described, modifications may occur to those skilled in the art upon reading the specification. The present application includes such modifications and is limited only by the scope of the claims.

What is claimed is:

1. A torch tip for a plasma arc torch for reducing molten spatter buildup during operation of the plasma arc torch, the torch tip comprising:
   a body having a first end and a second end, the first end of the body configured to attach to the plasma arc torch;
   an end wall disposed at the second end of the body;
   a plasma exit orifice formed in the end wall at the second end of the body;
   at least two castellations formed in the end wall; and
   at least one slot disposed between two castellations, the at least one slot defined by a first castellation wall, a second castellation wall opposite the first castellation wall, and a slot floor, the torch tip having at least one of the following characteristics:
   (a) a slope of the slot floor within the at least one slot tapers in an outward radial direction relative to the plasma exit orifice toward the first end of the body, or
   (b) a distance between the first and second castellation walls along the slot floor increases with distance away from the plasma exit orifice.

2. The torch tip of claim 1 wherein the torch tip includes three slots.

3. The torch tip of claim 1 wherein the torch tip is a shield.

4. The torch tip of claim 1 wherein the first castellation wall and the second castellation wall are angled from about 45 arc degrees to about 75 arc degrees about the end wall.

5. The torch tip of claim 1 wherein the at least one slot has a rounded, generally semi-cylindrical, or generally semi-frustoconical geometry.

6. The torch tip of claim 1 wherein the torch tip is made from a material having a high thermal conductivity.

7. The torch tip of claim 6 wherein the torch tip is formed of copper.

8. The torch tip of claim 1 wherein the torch tip includes three slots and three castellations separating each of the slots.

9. The torch tip of claim 8 wherein each castellation has a substantially planar top surface.

10. The torch tip of claim 1 wherein the height of the first and second castellation walls increases with distance from the exit orifice.

11. A shield for a plasma arc torch comprising:
    a body having a first end and a second end, the first end of the body configured to attach to the plasma arc torch;
    an end wall disposed at the second end of the body;
    a plasma exit orifice formed in the end wall at the second end of the body;
    at least two castellations formed in the end wall; and
    no more than three slots disposed between the at least two castellations, each slot having a generally semi-frustoconical geometry and defined by a first castellation wall, a second castellation wall opposite the first castellation wall, and a slot floor, wherein the shield has at least one of the following characteristics:
    (a) a slope of the slot floor within the at least one slot tapers in an outward radial direction relative to the plasma exit orifice toward the first end of the body, or
    (b) a distance between the first and second castellation walls along the slot floor increases with distance away from the plasma exit orifice.

12. The shield of claim 11 wherein the shield includes three castellations and three slots disposed between the castellations.

13. The shield of claim 11 wherein the first castellation wall and the second castellation wall are angled from about 45 arc degrees to about 75 arc degrees about the end wall.

14. A torch tip for a plasma arc torch for reducing molten spatter buildup during operation of the plasma arc torch, the torch tip comprising:
    a body having a first end and a second end, the first end of the body configured to attach to the plasma arc torch;
    an end wall disposed at the second end of the body;
    a plasma exit orifice formed in the end wall at the second end of the body;
    three castellations formed in the end wall; and
    three slots disposed between the castellations, each slot defined by a first castellation wall, a second castellation wall opposite the first castellation wall, and a slot floor, wherein the torch tip has at least one of the following characteristics:
    (a) a slope of the slot floor within the at least one slot tapers in an outward radial direction relative to the plasma exit orifice toward the first end of the body, or
    (b) a distance between the first and second castellation walls along the slot floor increases with distance away from the plasma exit orifice.

15. The torch tip of claim 14 wherein the torch tip is a shield.

16. The torch tip of claim 14 wherein the slots extend radially from the plasma exit orifice.

17. A plasma arc torch system comprising:
    a torch body defining a plasma gas flow path for directing a plasma gas to a plasma chamber in which a plasma arc is formed;
    an electrode disposed within the torch body;
    a nozzle disposed relative to the electrode at a distal end of the torch body to define the plasma chamber; and
    a shield disposed relative to an exterior surface of the nozzle at the distal end of the torch body, the shield comprising:
    a shield body having a first end configured to attach to the torch body and a second end;
    an end wall disposed at the second end of the body;

a plasma exit orifice formed in the end wall at the second end of the shield body;

at least two castellations formed in the end wall; and at least one slot disposed between two castellations, the at least one slot being defined by a first castellation wall, a second castellation wall opposite the first castellation wall, and a slot floor, the shield having at least one of the following characteristics:

(a) a slope of the slot floor within the at least one slot tapers in an outward radial direction relative to the plasma exit orifice toward the first end of the body, or (b) a distance between the first and second castellation walls along the slot floor increases with distance away from the plasma exit orifice.

* * * * *